United States Patent [19]

Nelle

[11] Patent Number: 4,459,751

[45] Date of Patent: Jul. 17, 1984

[54] SELECTION ELEMENT HOUSING FOR INCREMENTAL MEASURING APPARATUS

[75] Inventor: Guenther Nelle, Bergen, Fed. Rep. of Germany

[73] Assignee: Dr. Johannes Heidenhain GmbH, Traunreut, Fed. Rep. of Germany

[21] Appl. No.: 556,624

[22] Filed: Nov. 30, 1983

[30] Foreign Application Priority Data

Dec. 8, 1982 [DE] Fed. Rep. of Germany ....... 3245357

[51] Int. Cl.³ .............................................. H01J 3/14
[52] U.S. Cl. .................................. 33/125 C; 356/374; 250/237 G
[58] Field of Search ............. 33/125 C, 125 R, 125 A, 33/125 T, 1 AA; 356/373, 374, 375; 250/237 G

[56] References Cited

U.S. PATENT DOCUMENTS 4,101,764 7/1978 Nelle ................................ 250/237 G
4,363,964 12/1982 Schmitt .......................... 250/237 G
4,385,836 5/1983 Schmitt .................................. 356/374

Primary Examiner—Willis Little
Attorney, Agent, or Firm—Willian, Brinks, Olds, Hofer, Gilson & Lione Ltd.

[57] ABSTRACT

An improvement is disclosed for an incremental measuring apparatus of the type which includes a graduation and a plurality of reference marks on a scale, in which selection elements are provided to allow individual ones of the reference marks to be selected to go into operation during the measuring process. The selection element is mounted within a housing which includes at least one clamping element which operates to clamp the housing in position in a guide groove extending along the measuring scale. The combination of the housing and the clamping element operates to clamp the selection element securely in place in alignment with the selected reference mark.

12 Claims, 8 Drawing Figures

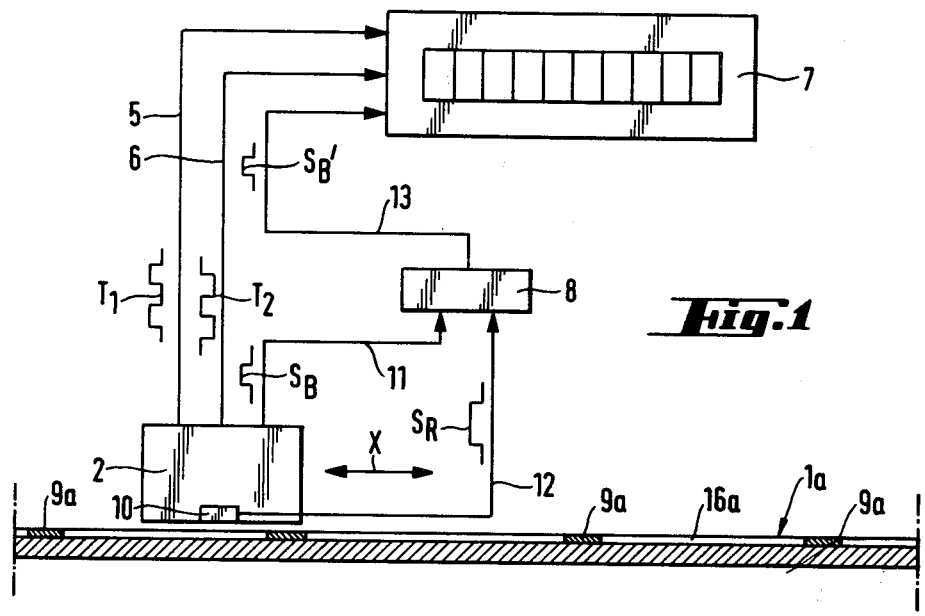
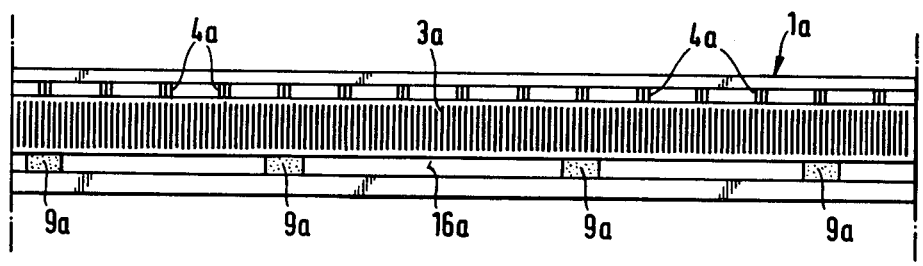

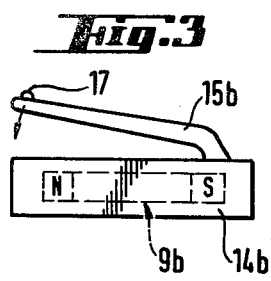
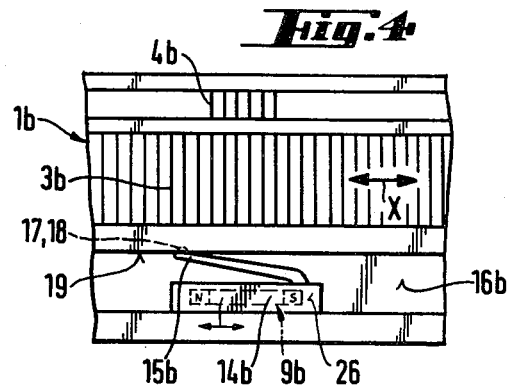
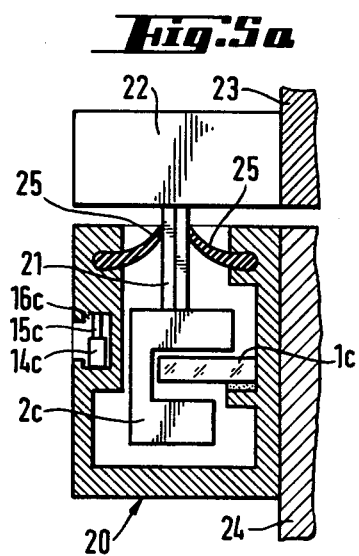
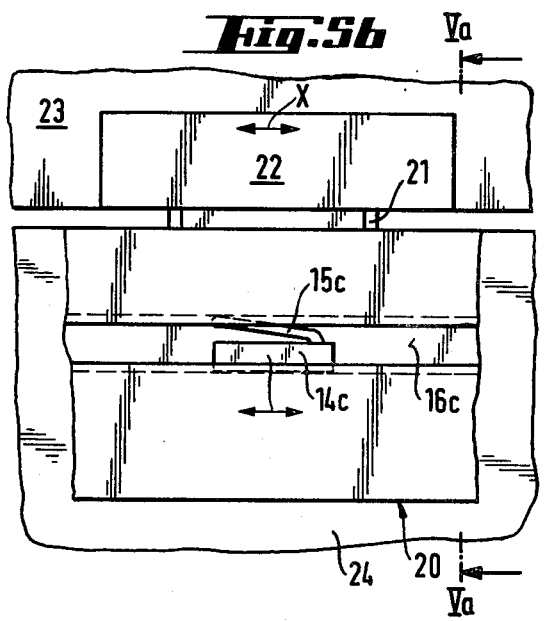
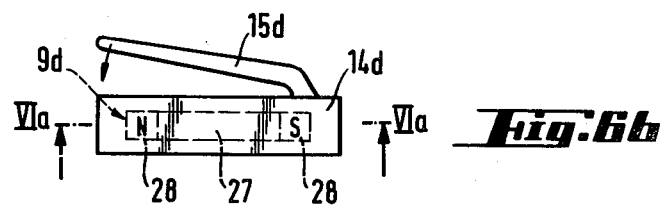

4,459,751

SELECTION ELEMENT HOUSING FOR INCREMENTAL MEASURING APPARATUS

BACKGROUND OF THE INVENTION

The present invention relates to an improvement suitable for use in an incremental measuring apparatus of the type which comprises a graduation, a plurality of reference marks positioned at predetermined locations with respect to the graduation, a scanning unit for generating a reference signal in response to the reference marks, at least one selection element positioned adjacent to a selected one of the reference marks, and means, movable with the scanning unit, for detecting the selection element and for gating the reference signal in response to the detection of the selection element.

In measuring devices of this type, the reference signals generated by means of the reference marks can be used in various ways. For example, such reference signals can be used to set a counter which displays the measured position to the value zero, to trigger the loading of a predetermined position value into the counter, to control or check for the presence of interfering counting pulses, as well as to act on a control arrangement which is responsive to the measuring system.

German DE-AS No. 25 40 412 discloses an incremental measuring system in which a scale is provided which includes a graduation and a series of reference marks formed on the scale in the manufacture of the graduation. At least one physically discrete selection element is mounted so as to slide in a groove defined either by the scale itself or in the immediate vicinity of the scale. This selection element is used to select one or more reference marks and a selection element is positioned adjacent to each reference mark that is to go into operation during the measuring process. In the disclosed embodiment, the selection element comprises a magnet, and a magnetically responsive switch is mounted on the scanning unit such that when the scanning unit moves into the vicinity of the magnet, the magnetically responsive switch detects the presence of the magnet and generates an electrical signal which is applied to a logic circuit in conjunction with the signal generated by the scanning unit in response to the reference mark. This logic circuit generates a control signal at its output only if both the reference mark detection signal and the magnet detection signal are simultaneously generated by the scanning unit.

Such an incremental measuring apparatus is used, for example, in processing machines for measuring the relative position of two machine parts, such as the bed and slide piece of a machine tool. Such machines in use generate significant levels of vibration and jarrings, and such vibrations and jarrings can cause the selection element to move in the groove. When this happens, a clear correspondence between the position of the selection element and the selected reference mark (and the consequent activation of the selected reference mark) can no longer be assured. In the event reference marks are situated in closely adjoining relationship to one another, such displacements of the selection element can even cause the wrong reference mark to go into operation, so that an erroneous control process, for example a zeroing process, is triggered at an undesirable point, thereby resulting in an erroneous measuring result. In addition, when the selection element takes the form of a magnet, metal shavings and cuttings are attracted to the selection element with a considerable magnetic force, and such shavings and cuttings can only be removed with difficulty.

SUMMARY OF THE INVENTION

The present invention is directed to an improvement to measuring devices of the type described initially above which fixes the position of the selection elements with respect to selected ones of the reference marks in a simple and reliable manner so as to substantially eliminate measuring and control errors of the type described above.

According to this invention, an incremental measuring apparatus of the type described initially above is provided with a guide defined by the measuring apparatus extending along the graduation. A housing is provided which encases a selection element, and this housing includes at least one clamping element configured to clamp the housing securely in position in the guide. This clamping element comprises a spring arm extending away from the housing and a projection positioned at a free end of the spring arm. The projection is positioned to engage the guide to secure the housing in place in the guide, and the spring action of the spring arm positively clamps the housing and therefore the selection element in place in the guide.

The present invention provides the important advantage that the selection element is fixed in place wit respect to the desired reference mark in a manner which is simple and inexpensive to implement, yet which substantially precludes any inadvertent shifting in the position of the selection element. In the preferred embodiment described below, the housing for the selection element and the clamping element may be constructed from one integral piece of a synthetic material, such as plastic. Furthermore, metal shavings, cuttings and other contaminants can easily be removed from the housing. Further advantageous features of the invention are set forth in the dependent claims attached hereto.

The invention itself, together with further objects and attendant advantages, will best be understood by reference to the following detailed description, taken in conjunction with the accompanying drawings.

BRIEF DESCRIPTION OF THE DRAWINGS

FIG. 1 shows a schematic representation of a prior art incremental measuring apparatus suitable for use with this invention.

FIG. 2 is a plan view of the prior art measuring scale included in the apparatus of FIG. 1.

FIG. 3 is a plan view of a housing and clamping element which incorporate a first preferred embodiment of this invention.

FIG. 4 is a plan view of a section of a measuring scale which defines a guide sized to receive the embodiment of FIG. 3.

FIG. 5a is a cross-sectional view of an encapsulated measuring apparatus which incorporates a second preferred embodiment of this invention.

FIG. 5b is a longitudinal sectional view of portions of the measuring apparatus of FIG. 5a.

FIGS. 6a and 6b are a longitudinal sectional view and a plan view, respectively, of a housing which incorporates a third preferred embodiment of this invention.

DETAILED DESCRIPTION OF THE PRESENTLY PREFERRED EMBODIMENTS

Turning now to the drawings, FIG. 1 is a schematic representation of a prior art photoelectrical incremental, length measuring apparatus suitable for use with this invention. This measuring apparatus includes a measuring scale 1a and a scanning unit 2. The scale 1a and the scanning unit 2 are adapted in each case to be connected with objects, the position of which are to be measured via the measuring apparatus. For purposes of clarity, the connections of these two objects are not shown in FIG. 1. As shown in FIG. 2, the scale 1a serves as a carrier for a measuring graduation 3a which takes the form of a line grid. This measuring graduation 3a is scanned in direct illumination, photoelectrically and without mechanical contact by the scanning unit 2. Alongside the measuring graduation 3a on the scale 1a there is provided a series of equidistant reference marks 4a. Each of the reference marks 4a is made up of a respective line group, and each of the line groups defines the same predetermined line distribution. The scanning unit 2 operates to generate scanning signals in response to relative movement between the graduation 3a and the scanning unit 2. These scanning signals are amplified in the scanning unit 2 and are transformed into square wave signals $T_1, T_2$ which are applied via electrical conductors 5,6 to an electronic counter 7. The electronic counter 7 operates to display the measured position in digital form. The square wave signals $T_1, T_2$ are phase shifted with respect to one another by a quarter of the grid constant of the graduation 3a in order to allow discrimination of the scanning direction. The scanning unit 2 also includes means for detecting the reference marks 4a and for generating a square wave reference signal $S_B$ in response to the detection of reference marks 4a. The square wave reference signal $S_B$ is applied via an electrical conductor 11 to a logic circuit 8.

In the apparatus of FIGS. 1 and 2 particular ones of the reference marks 4a that are intended to go into operation in the measuring process are selected by means of selection elements 9a. In this apparatus, each of the selection elements 9a takes the form of a magnet disposed in a guide groove 16a defined in the scale 1a. The scanning unit 2 includes a switching means 10 mounted to the scanning unit 2 and this switching means 10 takes the form of a reed switch which is magnetically responsive and is positioned to switch state when the scanning unit 2 moves into alignment with one of the selection elements 9a. The reed switch included in the switching means 10 generates a selection signal $S_R$ which is applied via an electrical conductor 12 to the logic circuit 8. The selection signal $S_R$ is only generated when the switching means 10 is positioned in alignment with one of the selection elements 9a. Only if the signals $S_B$, $S_R$ are simultaneously applied to the inputs of the logic circuit 8 is a control signal $S_B'$ generated. This control signal $S_B'$ is applied via an electrical conductor 13 to the electronic counter 7. The counter 7 may be programmed to respond to the control signal $S_B'$ for example by setting the numerical value displayed by the counter 7 to the value zero.

According to this invention, each of the magnetic selection elements 9b is enclosed within a non-magnetic housing 14b as shown in FIG. 3. This housing 14b includes a clamping element 15b in the form of a laterally extending spring arm. The clamping element 15b defines a projection 17 near the free end of the spring arm. The spring arm can be deflected downwardly in the direction of the arrow of FIG. 3, and it resiliently resists such deflection. Thus, in response to deflection in the direction of the arrow of FIG. 3, the clamping element 15b actively urges the projection 17 away from the selection element 9b. As shown in FIG. 4, the housing 14b with the enclosed magnet 9b is movable in order to allow the magnet 9b to be positioned in alignment with a selected one of the reference marks 4b. The housing 14b slides in a guide groove 16b defined in a measuring scale 1b. This measuring scale 1b acts as a carrier for a measuring graduation 3b which extends along the direction of movement of the scanning unit 2 (the measuring direction X). The magnet 9b is securely fixed in position with respect to the reference mark 4b by means of the clamping element 15b. The clamping force generated by the clamping element 15b against the lateral wall 19 of the guide groove 16b substantially prevents any inadvertent shifting of the location of the magnet 9b, for example by jarrings or vibration of the measuring scale 1b. Preferably, the lateral surface 19 of the guide groove 16b defines a plurality of recesses 18, each sized to receive the projection 17. These recesses 18 operate to define discrete positions, each of which is allocated with a respective one of the reference marks 4b. Thus, as the housing 14b is shifted in the guide groove 16b, preselected positions are defined in order to facilitate the proper placement of the selection element 9b.

FIGS. 5a and 5b are transverse in longitudinal sectional views, respectively, of an encapsulated length measuring apparatus which incorporates a second preferred embodiment of this invention. In this embodiment, a measuring scale 1c is mounted to a carrier 20 which takes the form of a hollow profile which is closed by sealing lips 25. The measuring scale 1c is mounted in the interior of the carrier 20, and the measuring scale 1c is scanned by a scanning unit 2c. The scanning unit 2c is fastened by means of a follower 21 and a mounting element 22 to the slide piece 23 of a machine tool (not shown). The carrier 20 is mounted to the bed 24 of the machine. The carrier 20 defines a T-shaped guide groove 16c in an outside surface of the hollow profile, facing away from the bed 24 of the machine. A selection element (not shown) is mounted within a housing 14c which defines a clamping element 15c similar to those described above in conjunction with FIGS. 3 and 4. The housing 14c serves to enclose the selection element, and the clamping element 15c serves to clamp the housing 14c and therefore the selection element securely in place in the guide groove 16c. In this way, the housing 14c and the selection element are securely held in place with respect to a selected reference mark (not shown) included on the measuring scale 1c. The guide groove 16c can in alternate embodiments be provided outside of the carrier 20 on the bed 24 of the machine.

As shown in FIGS. 3 and 4, the magnet 9b and the housing 14b are preferably dimensioned in such a way that the exit or emergence surface of the magnetic field lines from the magnet 9b is disposed within the housing 14b. In particular, the housing 14b defines an outer surface 26 which faces the switching means 10 in the scanning unit 2 (FIG. 2), and the exit surface of the magnet 9b lies inside the outer surface 26 of the housing 14b. This arrangement allows metal shavings which collect on the outer surface 26 to be removed relatively easily by a simple stripping operation. This is due to the fact that the magnetic field strength at the outer surface 26 is no longer sufficiently great to retain metal shavings in place tightly.

FIGS. 6a and 6b represent a longitudinal sectional and a plan view, respectively, of a housing 14d which includes a clamping element 15d. In the interior of the housing 14d there is arranged a selection element 9d which is made up of two magnets 28 arranged with opposite polarity on a magnetic plate 27. This arrangement provides a defined magnetic field line pattern for precise actuation of the switching means 10.

In a manner not shown in the drawings, the switching means (such as a reed switch) rather than the magnet can be mounted in the housing which includes the clamping element. When this is done, corresponding magnets are provided in the scanning unit. Preferably, the housing 14 and the clamping element 15 are formed as one integral piece of a synthetic plastic material, and the selection element 9 is cast in place within the housing 14. In alternate embodiments, a field plate or a Hall effect sensor can be substituted for the reed switch as the switching means 10. Furthermore, several selection elements 9 can be used, each allocated with a respective selected reference mark 4. Moreover, inductive and capacitive selection elements can also be used with this invention.

In a manner not shown in the drawings, the housing 14 with the clamping element 15 can also be formed of a transparent material. This is particularly useful when the selection element is an optical selection element such as a mirror, prism, or light source. When the selection element is a mirror or a prism, a light source and a photosensor are preferably arranged on the scanning unit so as to detect the mirror or prism. When the mirror or prism of the selection element is positioned properly, light from the light source of the scanning unit is deflected by the selection element to the photosensor, and the photosensor of the scanning unit acts as a switching means. If a light source is used as the selection element, light from the light source can be directed to fall directly on the photosensor included in the scanning unit as a switching means.

Of course, it should be understood that a wide range of changes and modifications to the preferred embodiments described above will be apparent to those skilled in the art. For example, the invention is not restricted to use with photoelectric measuring devices, but can also advantageously be used in connection with magnetic, inductive or capacitive measuring devices. Furthermore, this invention can also be used in conjunction with absolute measuring systems which include incremental measuring tracks. It is therefore intended that the foregoing detailed description be regarded as illustrative rather than limiting, and that it be understood that it is the following claims, including all equivalents, which are intended to define the scope of this invention.

I claim:

1. In an incremental measuring apparatus of the type comprising a graduation; a plurality of reference marks positioned at predetermined locations with respect to the graduation; a scanning unit for generating a reference signal in response to the reference marks; at least one selection element positioned adjacent to a selected one of the reference marks; and means, movable with the scanning unit, for detecting the selection element and for gating the reference signal in response to the detection of the selection element, the improvement comprising:

a guide defined by the measuring apparatus extending alongside the graduation; and
   a housing which encases the selection element, said housing comprising at least one clamping element configured to clamp the housing securely in position in the guide, said clamping element comprising a spring arm extending from the housing and a projection at a free end of the spring arm, said projection positioned to engage the guide to secure the housing in place in the guide.

2. The invention of claim 1 wherein the selection element comprises a magnetic element.

3. The invention of claim 1 wherein the selection element comprises an inductive element.

4. The invention of claim 1 wherein the selection element comprises a capacitive element.

5. The invention of claim 2 wherein the magnetic element comprises a magnetic plate and two magnets arranged with opposed polarity on the plate.

6. The invention of claim 2 wherein the magnetic element defines an emergence surface of magnetic field lines, wherein the housing defines an outer surface, and wherein the emergence surface is disposed within the outer surface.

7. The invention of claim 1 wherein the measuring apparatus comprises a hollow profile which supports the scale, and wherein the guide is defined in a surface of the profile.

8. The invention of claim 1 wherein the guide defines a plurality of recesses, each sized to receive the projection of the spring arm in order positively to locate the projection, spring arm and housing in place in the guide.

9. The invention of claim 1 wherein the housing and the clamping element are formed of a nonmagnetic material.

10. The invention of claim 9 wherein the nonmagnetic material is a synthetic plastic material.

11. The invention of claim 1 wherein the selection element comprises an optical element and wherein the housing is at least partially transparent.

12. The invention of claim 1 wherein the housing and the clamping element are integrally formed of one piece.

* * * * *